US007877526B2

(12) United States Patent
Toyohara et al.

(10) Patent No.: US 7,877,526 B2
(45) Date of Patent: *Jan. 25, 2011

(54) DATA PROCESSING SYSTEM HAVING A CHANNEL ADAPTER SHARED BY MULTIPLE OPERATING SYSTEMS

(75) Inventors: Yoshihiro Toyohara, Ninomiya (JP); Tetsuhiro Goto, Hadano (JP); Masaji Kume, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/721,964

(22) Filed: Mar. 11, 2010

(65) Prior Publication Data

US 2010/0235548 A1    Sep. 16, 2010

Related U.S. Application Data

(63) Continuation of application No. 11/224,965, filed on Sep. 14, 2005, now Pat. No. 7,680,965.

(30) Foreign Application Priority Data

Sep. 16, 2004    (JP) .............................. 2004-269111

(51) Int. Cl.
*G06F 13/00*    (2006.01)
(52) U.S. Cl. ........................................ 710/33; 719/319
(58) Field of Classification Search .................... 710/33
See application file for complete search history.

(56) References Cited

U.S. PATENT DOCUMENTS 5,414,851 A    5/1995    Brice et al.

(Continued)

FOREIGN PATENT DOCUMENTS

JP    09-274598    10/1997

(Continued)

*Primary Examiner*—Henry W Tsai
*Assistant Examiner*—Elias Mamo
(74) *Attorney, Agent, or Firm*—Antonelli, Terry, Stout & Kraus, LLP.

(57) ABSTRACT

A data processing system including a processing unit on which a control program runs, a plurality of operating systems (OS's) configured to run under control of said control program, a Peripheral Component Interchange (PCI) bus coupled to the processing unit, and a channel adaptor for data transmission/reception, wherein: the channel adaptor is coupled to the PCI bus on a PCI bus side of the channel adapter, and the channel adapter includes only one connecting port on an input/output (I/O) side of the channel adapter; an input/output process is executed between each OS and said channel adaptor by using input/output process control data specifying input/output (I/O) data, the input/output process control data being provided via a Queue Pair having a Queue Pair identifier and including a Send Queue, Receive Queue and Complete Queue; configuration information is provided, exclusively defining the Queue Pair identifier of said Queue Pair of said input/output process control data which is usable exclusively by each respective OS; said channel adaptor can process a plurality of input/output process control data; and each OS uses said input/output process control data corresponding to a unique usable Queue Pair identifier and defined in said configuration information, and thereby a plurality of OS's control input/output process control data having different Queue Pair identifiers relative to said channel adaptor to execute the input/output process without sharing said input/output process control data for said channel adaptor by different OS's.

1 Claim, 10 Drawing Sheets

U.S. PATENT DOCUMENTS

| | | |
|---|---|---|
| 6,125,411 A | 9/2000 | Sato |
| 6,615,303 B1 | 9/2003 | Endo et al. |
| 6,658,521 B1 | 12/2003 | Biran et al. |
| 6,745,259 B2 * | 6/2004 | Wagner ................. 710/33 |
| 6,877,158 B1 | 4/2005 | Arndt |
| 6,996,828 B1 | 2/2006 | Kimura et al. |
| 7,272,671 B2 * | 9/2007 | Arndt et al. ................. 710/23 |
| 7,493,409 B2 | 2/2009 | Craddock et al. |
| 7,617,340 B2 * | 11/2009 | Gregg .................. 710/62 |
| 2003/0154337 A1 * | 8/2003 | Ohno et al. ............. 710/260 |
| 2008/0168193 A1 * | 7/2008 | Bates et al. ................. 710/36 |

FOREIGN PATENT DOCUMENTS

| | | |
|---|---|---|
| JP | 2000-330806 | 11/2000 |
| JP | 2002-41306 | 2/2002 |
| JP | 2002-99437 | 4/2002 |
| WO | WO 97/010549 | 3/1997 |
| WO | WO 01/093032 | 12/2001 |
| WO | WO 2004/057798 | 7/2004 |

* cited by examiner

FIG.4
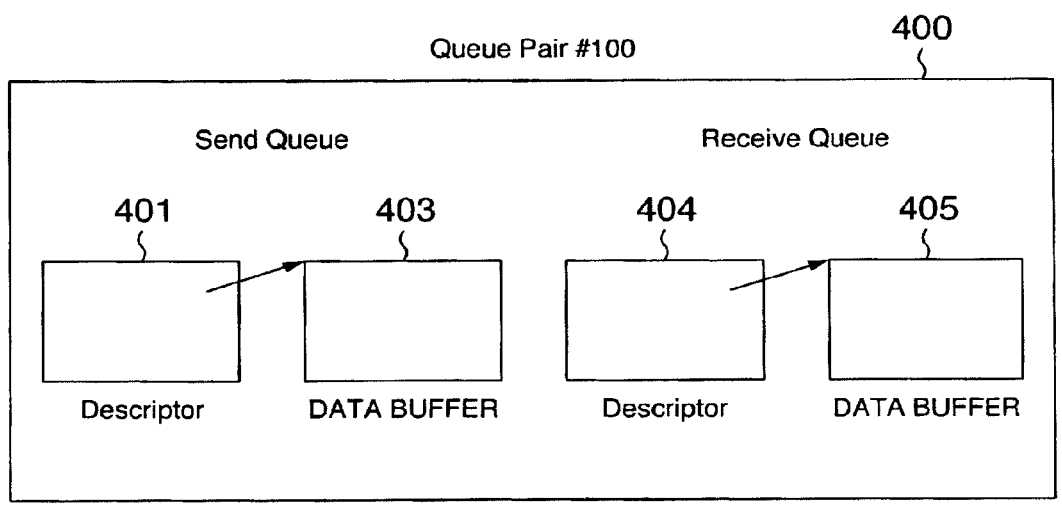
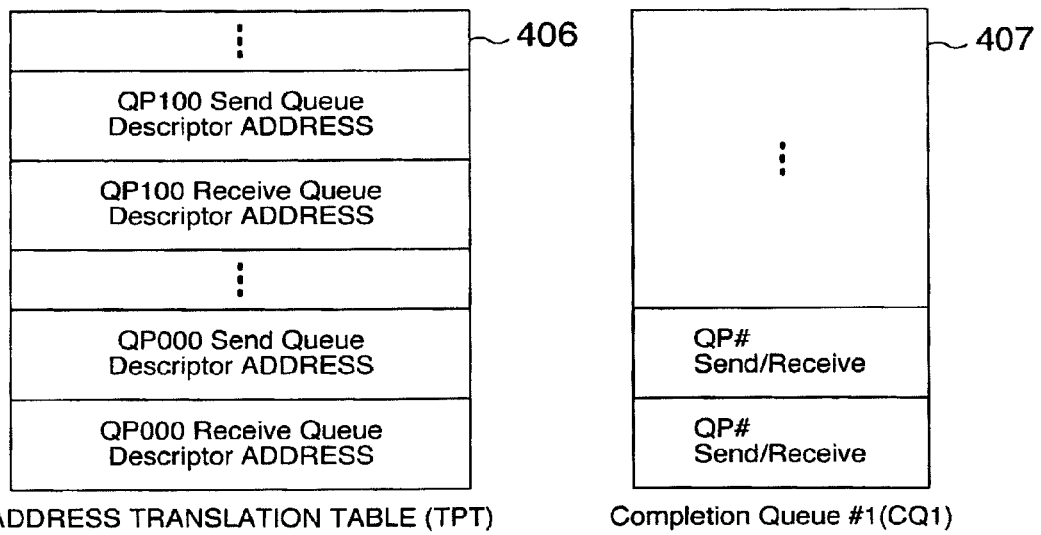

Send Queue

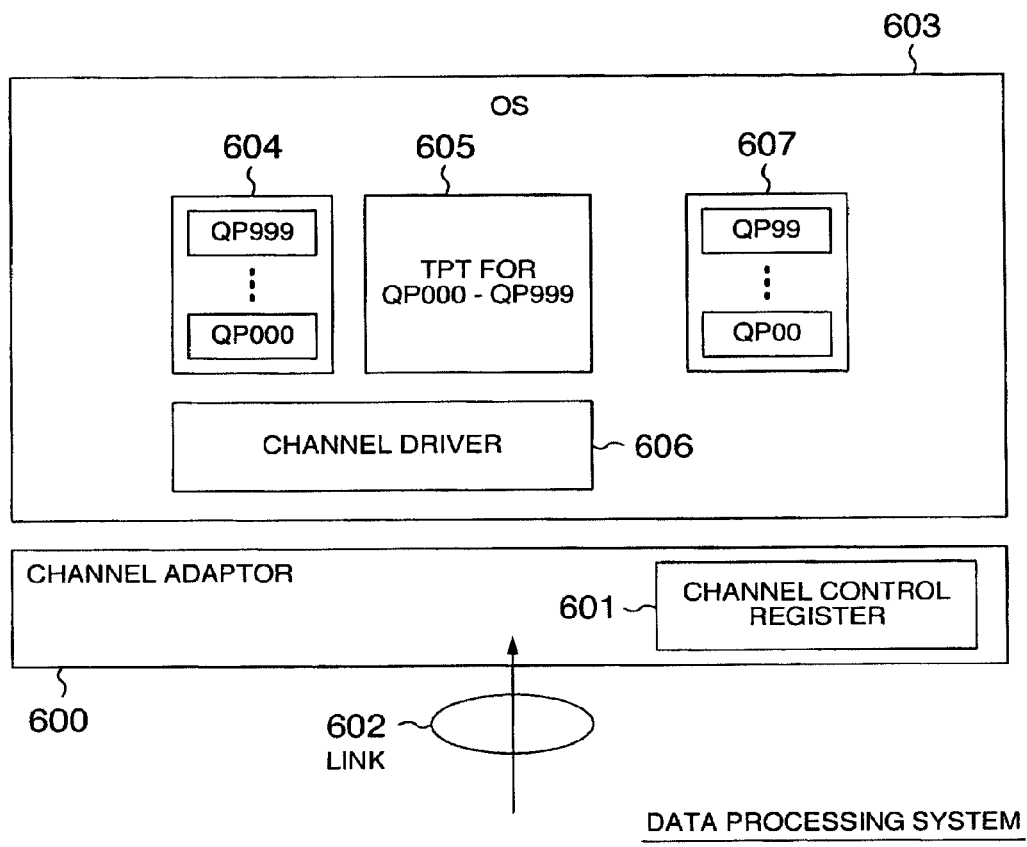

DATA PROCESSING SYSTEM HAVING A CHANNEL ADAPTER SHARED BY MULTIPLE OPERATING SYSTEMS

CROSS REFERENCE TO RELATED APPLICATION

This is a continuation of U.S. application Ser. No. 11/224,965, filed Sep. 14, 2005 now U.S. Pat. No. 7,680,965. This application relates to and claims priority from Japanese Patent Application No. 2004-269111, filed on Sep. 16, 2004. The entirety of the contents and subject matter of all of the above is incorporated herein by reference.

BACKGROUND OF THE INVENTION

The present invention relates to a data processing system for transferring data, and more particularly to a computer system which runs a plurality of operating systems (OS's) and executes processes of OS's at the same time by using a single channel adaptor.

Only a main frame has supported heretofore an LPAR (Logical Partition) function of running a plurality of OS's in one system under a control program. Recently, not only a main frame but also an open source server supports the LPAR function. An input/output channel adaptor is inserted into a slot of an open source server supporting the LPAR function. As a business standard specification means for connecting the channel adaptor to a host processor, a PCI (Peripheral Component Interchange) bus stipulated by PCI-SIG (Special Interest Group) has been used widely. In the case of the PCI bus, a PCI configuration register is provided as a standard component for each device such as a channel adaptor. It is difficult to share the device by a plurality of OS's, because only one control register is provided for controlling the device, and other reasons.

An example of a system supporting the LPAR function is disclosed in JP-A-2002-41306. Although a plurality of OS's can run on one system, a PCI I/O adaptor having a PCI bus as an interface cannot be shared by a plurality of OS's so that a PCI I/O adaptor is provided to each OS.

Another example is disclosed in JP-A-2002-99437 which realizes an LPAR function in a main frame or the like. The outline of this example is shown in FIG. 10. A controller 1001 and a local memory 1002 are mounted on a LAN package 1000 having a LAN adaptor 1003 as a PCI I/O device to share the LAN adaptor by a plurality of OS's. The controller 1001 has a driver 1005 for the LAN adaptor. The controller 1001 is connected to a bus 1007 such as a PCI bus or a system specific bus, and to the LAN adaptor 1003 via a PCI bus 1004.

With reference to FIG. 11, the details of an operation of this system will be described. When the controller 1001 receives an input/output process activated from an OS1, transfer data 1105 of OS1 in a system memory is buffered in the local memory 1002, and input/output process control data 1103 of OS1 is stored in the local memory 1002 as input/output process control data for the LAN adaptor. Similarly, control data and transfer data for an input/output process activated from OS2 are stored in the local memory 1002. The LAN adaptor 1003 transfers data by accessing not the system memory but the local memory 1002. The control data is newly written in the local memory of the LAN package and the transfer data is buffered in the local memory so that the performance of the system is influenced and a development cost is required.

Although the LPAR function is supported recently by an open source server, there is a limit in the number of slots capable of being mounted. It is therefore desired to share one channel adaptor by a plurality of OS's.

It is also desired to share a channel adaptor without using a hardware controller and local memory in order to reduce a cost.

SUMMARY OF THE INVENTION

According to the above-described techniques, the open source server cannot realize that a plurality of OS's share a PCI I/O device having a PCI bus interface supported by the open source server, whereas although the main frame can realize that a plurality of OS's share a PCI I/O device, the local memory for a data buffer and input/output process control data and the controller for the data buffer and input/output process control data are mounted on the package. Use of the controller and local memory results in degraded performance and increased cost.

It is an object of the present invention to share one channel adaptor by a plurality of OS's by using a standard specification bus such as PCI.

It is another object of the present invention to share one channel adaptor, such as a device having a PCI bus interface, by a plurality of OS's without using a hardware controller and local memory.

In a data processing system for executing an input/output process between each OS and a channel adaptor by using input/output process control data having an identifier, a channel driver as an interface between each OS and the channel adaptor for controlling the input/output process control data acquires from a control program a virtual computer number representative of an OS identifier of each OS operating the channel driver, the channel driver uses the virtual computer number and the input/output process control data having an identifier decided in system configuration information to be usable for the virtual computer number, and a plurality of OS's use input/output process control data having different identifiers for the channel adaptor to execute the input/output process without sharing the input/output process control data for the channel adaptor by different OS's.

In an interface between the channel driver and the channel adaptor, an address indicating the input/output process control data is a virtual address and the input/output process is executed by using an address translation table for translating the virtual address to a physical address, the channel driver generates the address translation table of the usable input/output process control data by using the virtual computer number acquired from the control program and the identifier of the usable input/output process control data obtained from the configuration information, the data processing system includes means for generating a virtual address translation table from a plurality of address translation tables generated by the channel driver of each OS, and the channel adaptor processes the input/output process control data of a plurality of OS's by using the virtual address translation table to execute the input/output process for a plurality of OS's without changing the input/output process control data generated by each OS.

According to the present invention, a channel adaptor can be provided which can execute an input/output (I/O) process requested from a plurality of OS's at the same time.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing Queue Pair and Completion Queue as I/O process control data and an address translation table.

FIG. 6 is a diagram showing the configuration of a data processing system.

FIG. 7 is a table showing a correspondence between LPAR numbers and usable QPs and CQs.

DESCRIPTION OF THE EMBODIMENTS

Sharing a PCI I/O device by a plurality of OS's is realized by software without using a controller and a local memory for controlling the PCI I/O device.

Channel adaptors in conformity with business standard specifications supported by an open source server include Fibre Channel defined by ANSI (American National Standards Institute), InfiniBand defined by IBTA (InfiniBand Trade Association) and the like.

In embodiments, a channel adaptor is assumed to use Que Pair constituted of Send Queue and Receive Queue, and Completion Queue used by InfiniBand or the like as input/output process control data for executing input/output process, a virtual address, and an address translation table (TPT) for translating a virtual address to a physical address.

Description will be made first on the outline of an input/output process.

Figure 2:
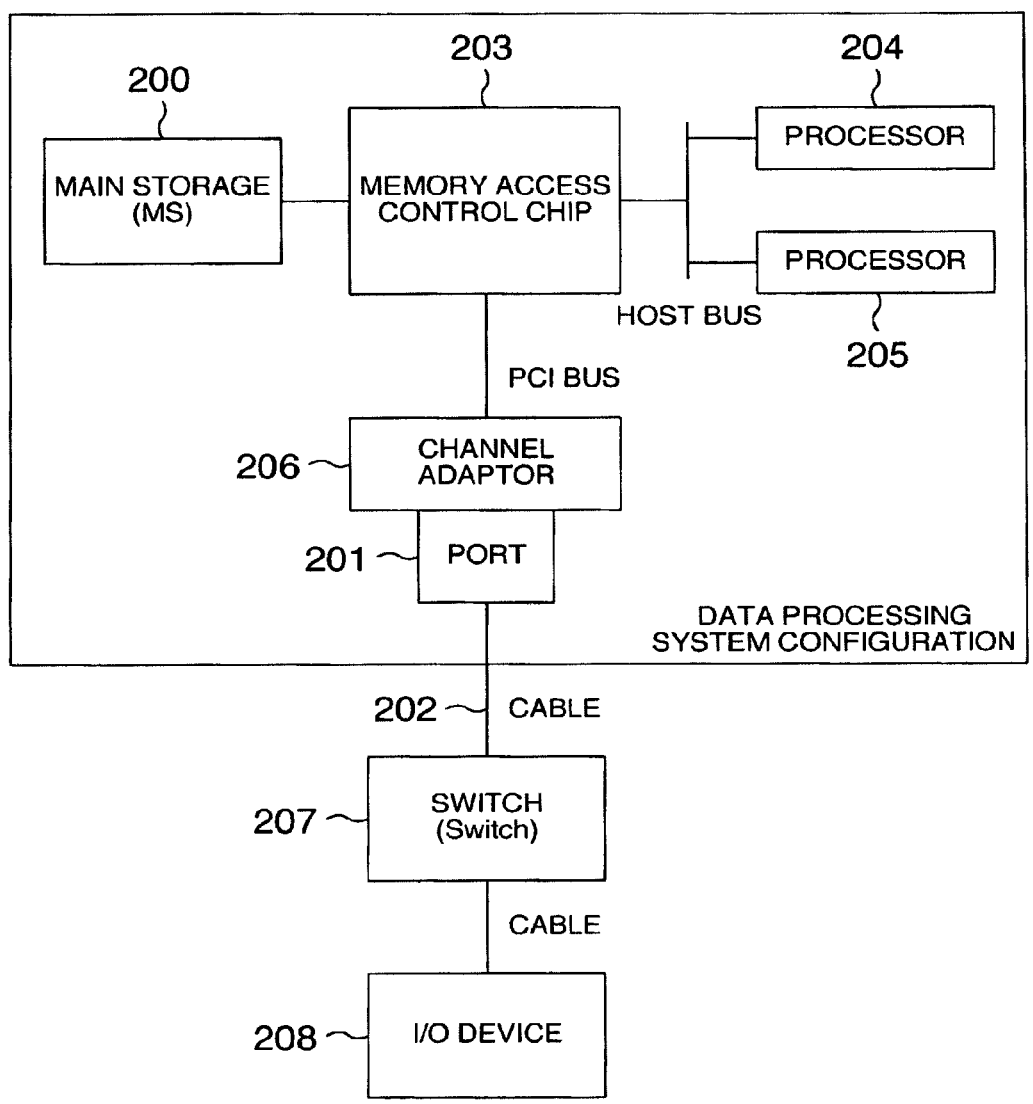
FIG. 2 is a diagram showing an example of the configuration of a data processing system.

FIG. 2 shows an example of the configuration of a data processing system. A memory access control chip 203 mainly controls an access to a main storage (MS) 200 from processors 204 and 205 and a channel adaptor 206. The memory access control chip 203 is connected to the channel adaptor 206 via a PCI bus. The memory access control chip 203 is connected to the processors 204 and 205 via a system specific host bus. The channel adaptor 206 has one port which is connected to an I/O device 208 via a switch 207. This data processing system supporting an LPAR function allocates, for example, 2 MB of MS 200 to each LPAR, and each OS in each LPAR runs by using a memory of 2 MB.

Figure 3:
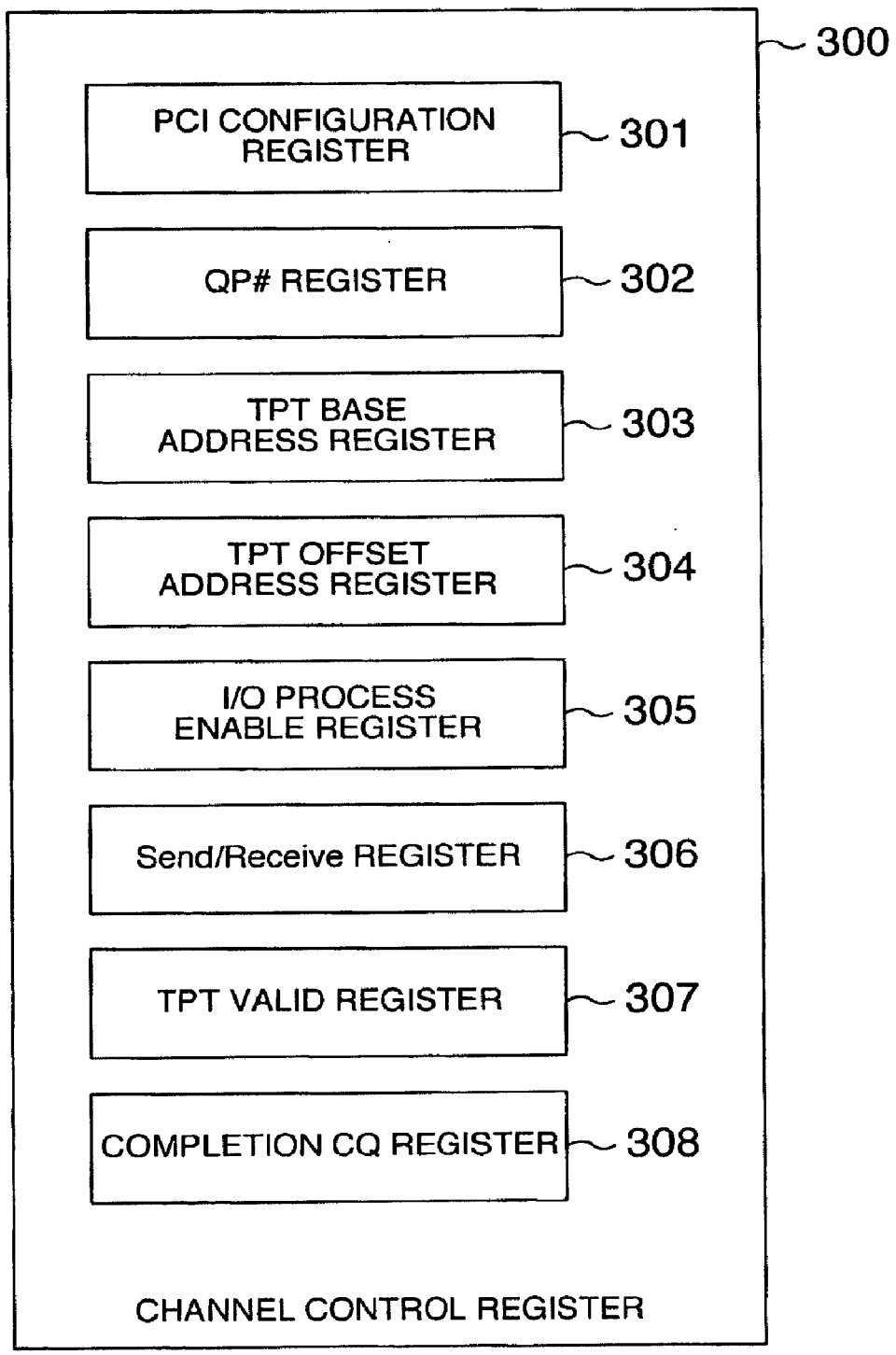
FIG. 3 is a diagram showing the contents of a channel control register in a channel adaptor.

The channel adaptor 206 of the data processing system using the PCI bus has a PCI configuration register as a standard component of a PCI bus connected device, and a channel control register for controlling the channel adaptor. The contents of the channel control resister are shown in FIG. 3, the details thereof being described later.

Next, description will be made on an interface of software and hardware for an input/output process (I/O process).

Each OS performs data transfer by using Queue Pair (QP) constituted of Send Queue and Receive Queue, and Completion Queue (CQ) for queuing an identifier of a processed QP. A channel driver in OS generates QP, controls CQ, and executes processes such as activating a data transfer process for the channel adaptor. FIG. 4 shows the outline of QP and CQ. Send Queue and Receive Queue are each constituted of Descriptor and a data buffer, Descriptor containing an address of the data buffer. Before data is transmitted, a physical address of a data buffer 403 storing transmission data of Send Queue is set to Descriptor 401. Before data is received, a physical address of a data buffer 405 storing reception data of Receive Queue is set to Descriptor 404. Each Queue Pair has an identifier. In the example shown in FIG. 4, Queue Pair has an identifier of #100 (QP100). The channel adaptor can execute processes of a plurality of QPs at the same time.

The physical address indicating each Descriptor is stored in an address translation table (TPT) 406. TPT is one physically continuous area and stores Send Queue Descriptor addresses and Receive Queue Descriptor addresses of all QPs to be used by the channel adaptor. Each of the Send Queue Descriptor address and Receive Queue Descriptor address has 16 bytes. The value "1" of the most significant bit indicates that the Descriptor address is valid, and the lower 8 bytes indicate the physical address of Descriptor.

Each CQ has an identifier of QP processed by the channel adaptor, the identifier containing information on which of Send Queue and Receive Queue was processed. Each entry of CQ has 16 bytes. If the most significant bit of upper 8 bytes is "1", it means that the entry is valid. The upper 4 bytes of lower 8 bytes are an identifier of processed QP. If the most significant bit of lower 4 bytes of the lower 8 bytes is "1", it means that Send Queue was processed, whereas if the most significant bit is "0", it means that Receive Queue was processed.

The value of a TPT base address register 303 defined in the channel control register 300 shown in FIG. 3 indicates a start address (physical address) of the address translation table (TPT) 406, this address being set by the channel driver. The channel adaptor accesses the address translation table (TPT) 406 by using the value in the TPT base address register 303.

Figure 5:
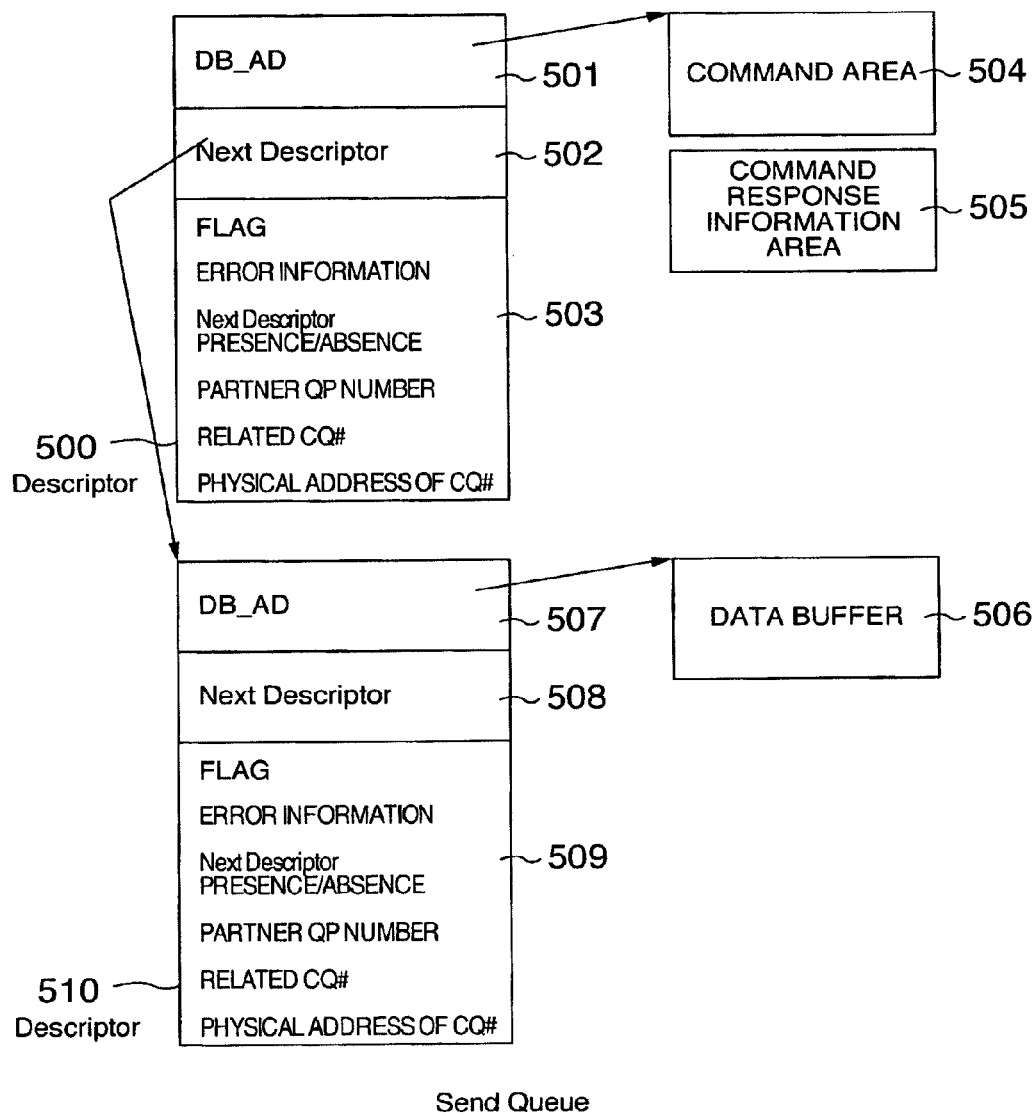
FIG. 5 is a diagram showing Send Queues as I/O process control data used by the embodiment of the present invention.

FIG. 5 shows the detailed data structure of Send Queue. In FIG. 5, DB-AD 601 is made of an 8-byte area indicating the start address (physical address) of a data buffer address area. FLAG 503 includes information on whether an I/O process is normally completed or erroneously completed, error information indicating a type of an occurred error, information on whether there is Descriptor to be next processed (presence/absence of Next Descriptor), a QP number of a data transfer partner, a related Q identifier (CQ#) and a physical address of CQ. If there is Descriptor to be next processed, a start address (physical address) of the next Descriptor is set to Next Descriptor 502 of an 8-byte length. In this embodiment, it is assumed that DB-AD of the first Descriptor 500 indicates a command area, and DB-ADs of the second and subsequent Descriptors 510 indicate data buffers 506. FIG. 5 shows the format of Send Queue. The format of Receive Queue is the same as that of Send Queue and reception data is stored in an area indicated by DB-AD.

An activation method for an I/O process is assumed: that the channel driver sets an identifier (QP#) of QP to be processed to a QP# register 302 defined in the channel control register 300, and sets information on which one of Send Queue and Receive Queue to a Send/Receive register 306;

that an area where QP Descriptor address as a virtual address is stored is set to a TPT offset address register 304; and that the channel adaptor is instructed to activate an I/O process by setting an offset address from the TPT base address and writing "1" in an I/O process enable register 305.

Before an I/O process is executed, the channel driver sets a physical address to DB-AD 501 and sets a command area (256 bytes) 504 to the area indicated by DB-AD. The command area contains, in addition to a command, information on a target ID indicating a partner port for the I/O process, a LUN indicating a device under the port and the like. A 256-byte area following the command area of 256 bytes is used as a command response information area 505 for storing a response frame to the command.

Next, information of FLAG 503 is set. A partner QP# and CQ1 as CQ# related to Descriptor are set, and the start address (physical address) of CQ1 is set.

Another Descriptor 510 is defined, and the start address of Descriptor 510 is set to Next Descriptor 502. The transmission data buffer 506 is at the address of DB_AD 507 of Descriptor 510. If the data buffer is made to have a variable length, information on the data length is stored in FLAG 509. In this embodiment, for the simplicity of description, the data buffer is made to have a fixed length of 4 K bytes and the data length is not set. As described above, the channel driver generates Send Queue and activates an I/O process. Although the partner QP number, related CQ# and physical address of CQ# are defined in FLAG of each Descriptor, it is assumed that the values in FLAG in the top Descriptor are valid.

When the channel adaptor recognizes an I/O process activation from the channel driver, it acquires the start address (physical address) of Descriptor in accordance with an offset (virtual address) set to the TPT offset address register 304 in the channel control register and an address translation table (TPT) 406. By using the physical address, a fetch process for Descriptor is executed, and in accordance with fetched Descriptor information, the command area 504 and transmission data buffer 506 are fetched. Data is transferred to a target ID designated in the command area 504 and the partner QP# designated in FLAG 503. When a response frame indicating a process completion is received from the partner, the response frame is stored in the command response information area 505. After the response frame is stored, in accordance with the information in FLAG 503, an identifier of processed QP, information on Send Queue, a valid bit of the entry are set to Completion Queue #1 (CQ1) 407, CQ# "1" is set to a completion CQ register 308 in the channel control register, and an I/O interrupt representative of completion of an I/O process is issued to OS. When an error occurs, error information is set to FLAG 503. The channel driver of OS recognizes the I/O interrupt, reads the completion CQ register 308 and executes a completion process of the I/O process activated to the channel adaptor in accordance with the contents of CQ1. The outline of the I/O process has been described above.

FIG. 6 illustrates the relation between software and the channel adaptor in which the I/O process is executed by using 1000 QPs from QP000 to QP999 604 and 100 CQs from CQ00 to CQ99 607. Next, an embodiment of the present invention will be described.

Figure 1:
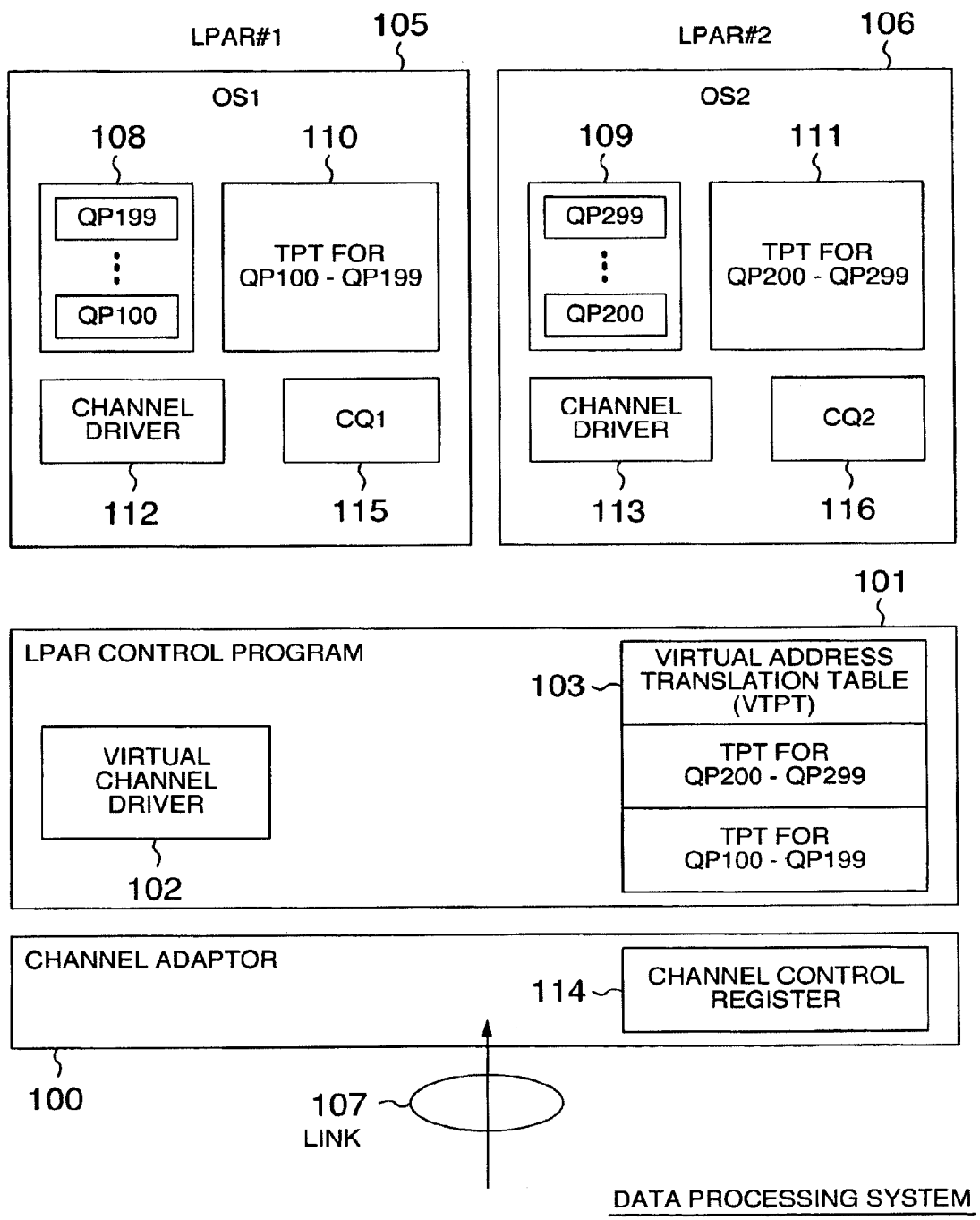
FIG. 1 is a diagram showing the configuration of a data processing system according to an embodiment of the present invention.

FIG. 1 shows the embodiment characteristic to the present invention. In this embodiment, two OS's share one channel adaptor.

In the data processing system shown in FIG. 1, under the control of a LPAR control program 101, two LPARs, LPAR#1 and LPAR#2, start up, OS1 105 runs in LPAR#1 and OS2 106 runs in LPAR#2.

It is assumed that each channel driver has a function which acquires LPAR# in which the channel driver runs. In this embodiment, acquired information is that a channel driver 112 runs in LPAR#1 and a channel driver 113 runs in LPAR#2. A virtual channel driver 102 is a driver which actually controls a channel adaptor 100. When the channel drivers 112 and 113 access a channel control register 114 of the channel adaptor 100 or perform other operations, the LPAR control program 101 intercepts the access function, and the virtual driver 102 accesses the channel control register 114.

In the data processing system, as shown in FIG. 7, the identifiers and numbers of Queue Pairs (QPs) and Completion Queues (CQs) capable of being used by each OS are defined as a portion of configuration information. The channel adaptor has been described above as being capable of processing 1000 QPs from QP000 to QP999 and 100 CQs from CQ00 to CQ99. These resources are distributed to each OS, and the configuration information is defined in such a manner that QPs or CQs having the same identifier are not shared by different OS's. In the example of FIG. 7, LPAR#1 can use 100 QPs from QP100, i.e., QP100 to QP199 and can use only one CQ1. Similarly, LPAR#2 can use 100 QPs from QP200, i.e., QP200 to QP299 and can use only one CQ2.

The channel driver acquires information on usable QP# and CQ# from the configuration information in LPAR# in which the channel driver runs, by using a kernel function or the like. Similarly, the LPAR control program acquires information on LPAR#, QP# and CQ# used by each LPAR from the configuration information by using the kernel function or the like.

The channel driver 112 controls QP100 to QP199, sets only Descriptor addresses of Send Queues and Receive Queues of QP100 to QP199 to TPT 110, and sets "1" to the address valid bit of the most significant bit. After the address of each Descriptor is set to TPT 110, the channel driver 112 writes the start address of TPT 110 in the TPT base address register 303 in the channel control register 114, and writes "1" in the TPT valid register 307 to notify that TPT is valid.

The LPAR control program 101 intercepts a function which makes the channel driver 112 write a value in the TPT base address register 303, and the virtual channel driver 102 writes a start address of a virtual address translation table (VTPT) 103 different from TPT 110 in the TPT base address register 303 of the channel control register 114. The LPAR control program also intercepts a function which makes the channel driver 112 write a value in the TPT valid register 307, the virtual channel driver 102 copies the address corresponding to the address valid bit "1" in TPT 110 to VTPT 103, and the LPAR control program 101 writes "1" in the TPT valid register 307.

Similarly, the channel driver 113 controls QP200 to QP299, sets only Descriptor addresses of Send Queues and Receive Queues of QP200 to QP299 to TPT 111, and sets "1" to the address valid bit of the most significant bit. After the address of each Descriptor is set to TPT 110, the channel driver 113 writes the start address of TPT in the TPT base address register 303 in the channel control register 114, and writes "1" in the TPT valid register 307 to notify that TPT is valid. Similar to the above description, the LPAR control program 101 intercepts a function which makes the channel driver 113 write a value in the TPT base address register 303, and the virtual channel driver 102 writes a start address of VTPT 103 in the TPT base address register 303 of the channel control register 114 (if the value is already set, the same value is overwritten). The LPAR control program 101 also intercepts a function which makes the channel driver 113 write a value in the TPT valid register 307, the virtual channel driver 102 copies the address corresponding to the address valid bit "1" in TPT 111 to VTPT 103, and the LPAR control program 101 writes "1" in the TPT valid register.

Figure 8:
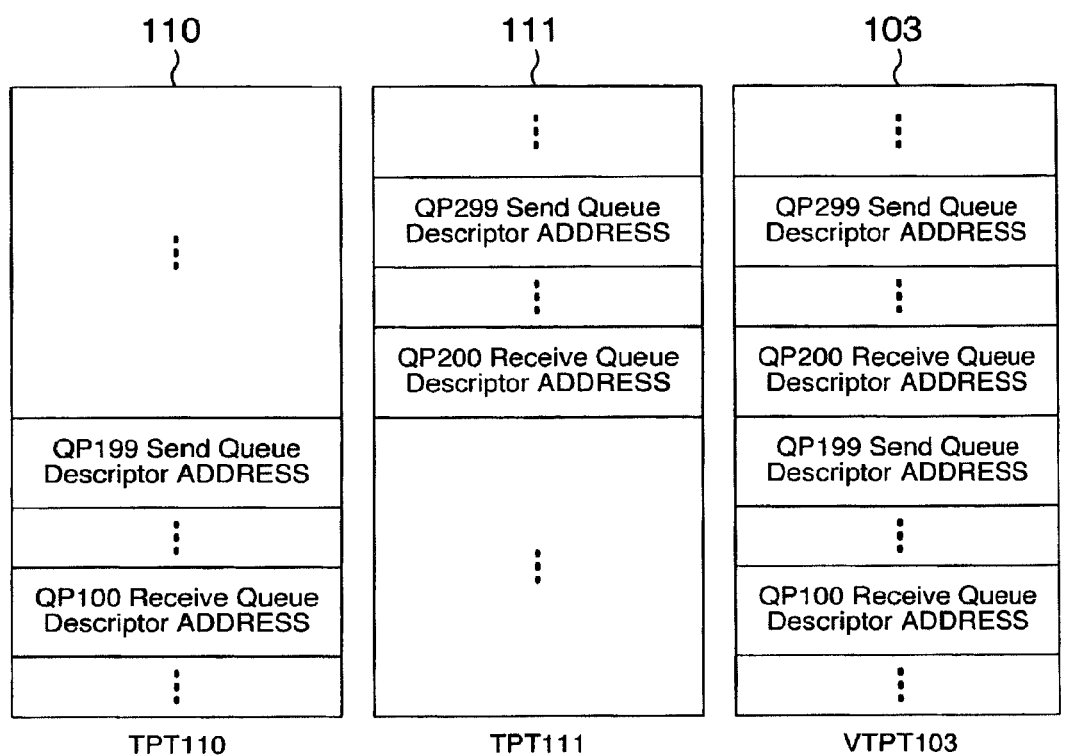
FIG. 8 is a diagram showing TPTs generated by each OS and a virtual TPT.

As shown in FIG. 8, the channel driver 112 sets values of only Descriptors of QP100 to QP199 to TPT 110 and the channel driver 113 sets values of only Descriptors of QP200 to QP299 to TPT 111. Therefore, each OS uses a different Descriptor and does not share the same Descriptor, and an offset from the top of each TPT is displaced. When the virtual channel driver 102 generates VTPT 103, the values of TPT 110 and TPT 111 can be easily copied without changing the offset from the TPT base address and only VTPT 103 is newly generated without copying transfer data and without changing other I/O control data such as Descriptor.

Figure 9:
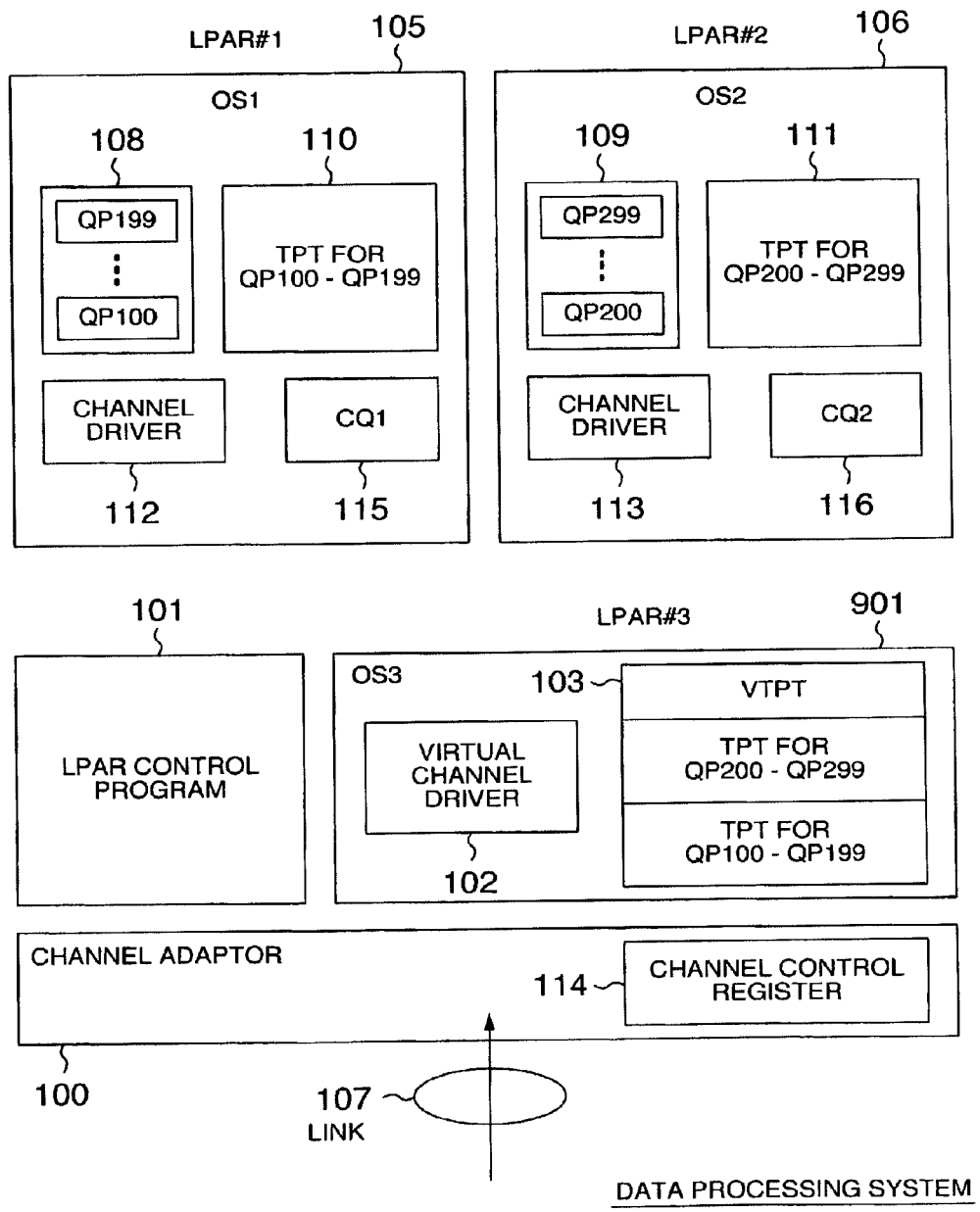
FIG. 9 is a diagram showing the configuration of a data processing system according to an embodiment of the invention.
Figure 10:
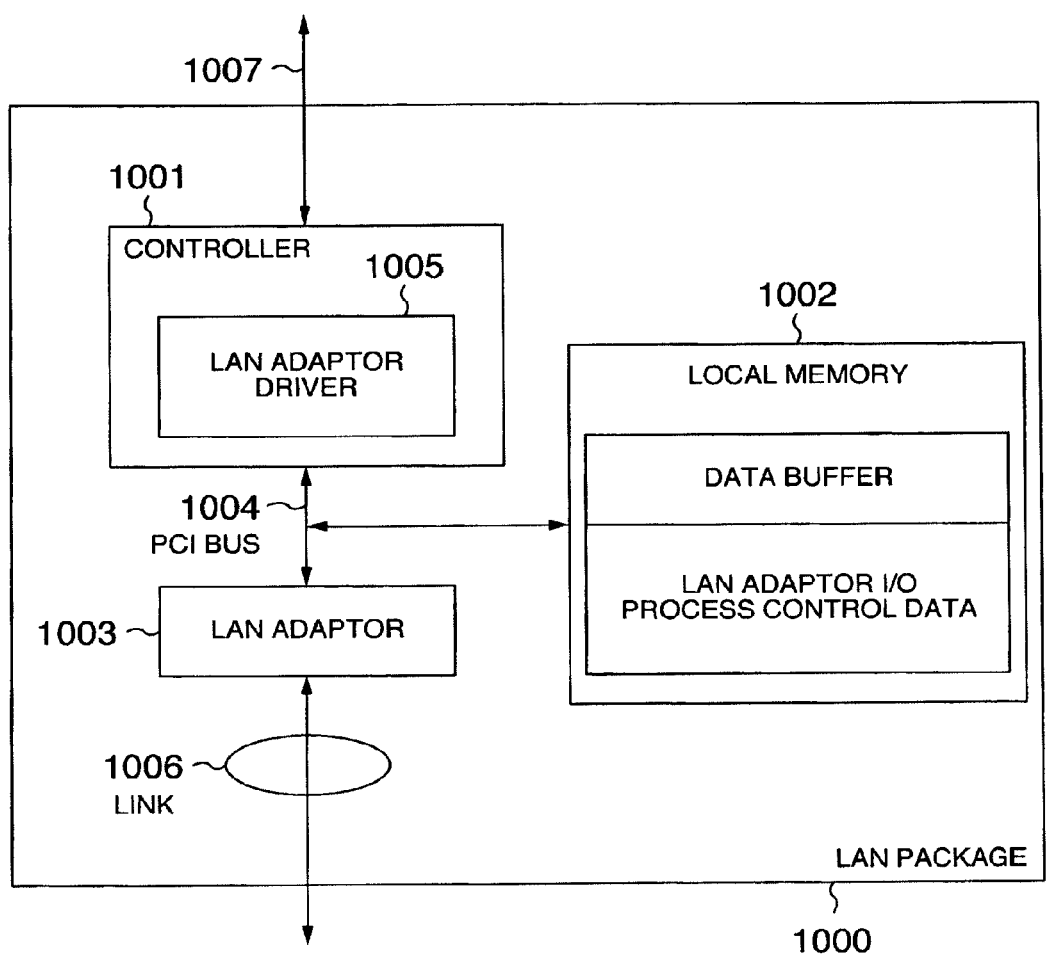
FIG. 10 is a diagram showing the outline of a conventional system.
Figure 11:
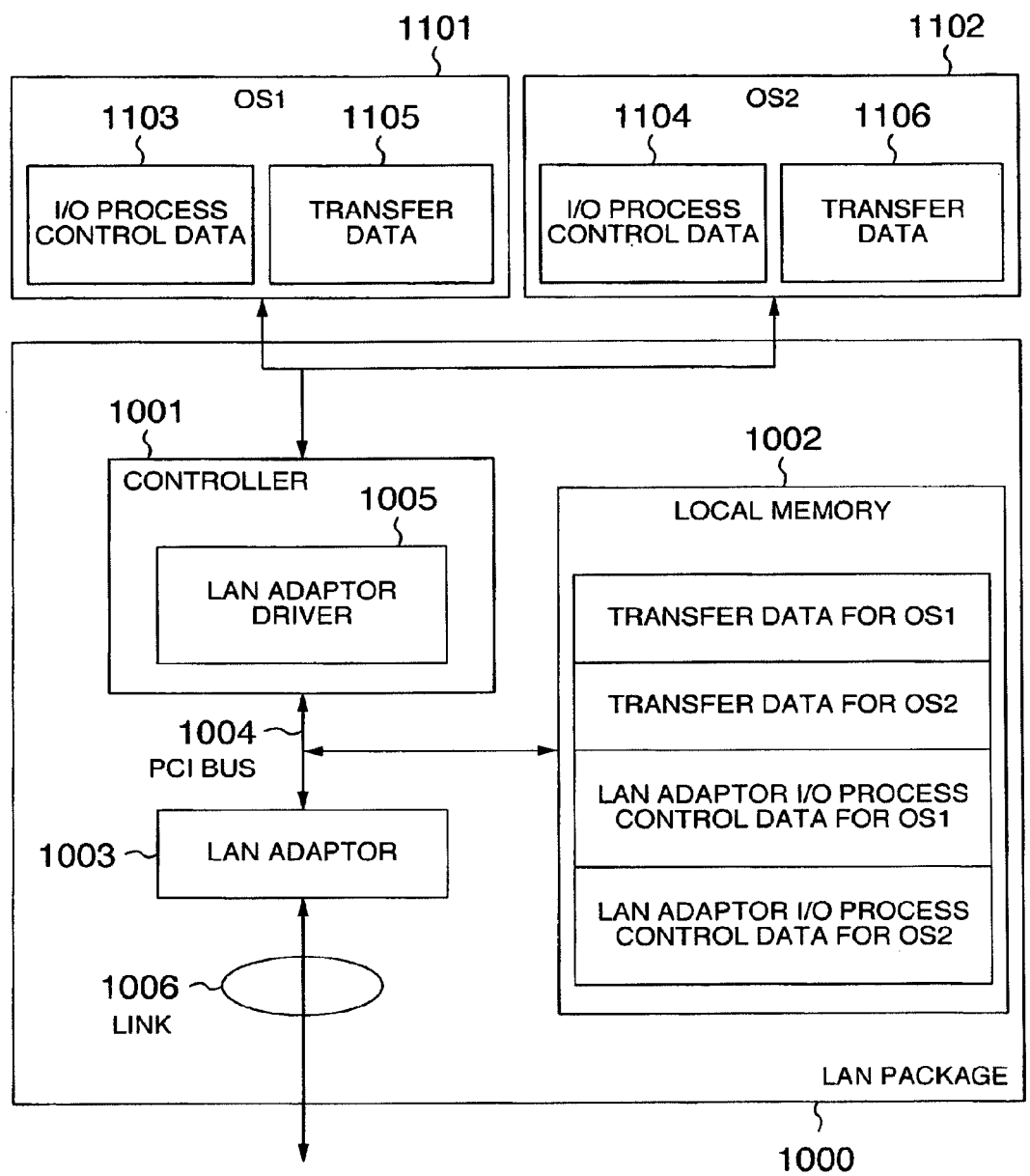
FIG. 11 is a diagram showing the details of the conventional system.

In this embodiment, although the virtual channel driver 102 exists in the LPAR control program 101, as shown in FIG. 9, OS3 901 may run in LPAR#3 to run the virtual channel driver 102 in OS3 901 and generate VTPT 103 in an OS3 control memory.

When "1" is set to the TPT valid register, the channel adaptor 100 fetches and holds VTPT to use the latest VTPT. Since the start address of VTPT 103 is set as the value of the TPT base address register 303 in the channel control register 114, the channel adaptor 100 uses VTPT 103.

Next, description will be made on a data transmission process to be executed by the channel driver 112 of OS1 105 by using QP100 and CQ1 shown in FIGS. 4 and 5. The channel driver 112 sets a physical address to DB_AD 501 of Send Queue of QP100, and sets the command area (256 bytes) to the area indicated by DB_AD 501. The channel driver also defines another Descriptor 510, sets the start address of Descriptor to Next Descriptor 502, and sets the transmission data buffer 506 at the address indicated by DB_AD 507 of Descriptor 510. The channel driver 112 sets #1 as the related CQ# and the start address of CQ1 to FLAG 509, and writes a value in the TPT offset address register 304 in the channel control register 114 for I/O process activation by using a kernel function. In this case, the LPAR control program 101 intercepts the function, and the virtual channel driver 102 writes a value in the TPT offset address register 304. Next, the channel driver 112 sets QP# to the QP# register 302 in the channel control register 114 and sets "1" to the I/O process enable register 305, by using the kernel function. In this case, the LPAR control program 101 intercepts the function, and the virtual channel driver 102 writes QP# in the QP# register 302 and "1" in the I/O process enable register 305.

When the channel adaptor 100 recognizes an I/O process activation from the virtual channel driver 102, the channel adaptor 100 acquires the start address of Descriptor in accordance with an offset set to the TPT offset address register 304 in the channel control register 114 and in accordance with VTPT 103. By using the start address, a fetch process for Descriptor is executed, in accordance with the fetched Descriptor information, the command area 504 and transmission data buffer 506 are fetched, and data is transferred to the target ID designated in the command area 504 and the partner QP# designated in FLAG 503. Data transfer is executed in accordance with a protocol, and when a response frame is received from the partner, the response frame is stored in the command response information area 505. After the response frame is stored, information representative of QP100 and Send Queue is set to CQ1, and CP# "1" is set to the completion CQ register 308 in the channel control register 114. Thereafter, an I/O interrupt indicating an I/O process completion is issued to OS.

The LPAR control program 101 intercepts the I/O interrupt, and the virtual channel driver 102 reads the value in the completion CQ register 308 in the channel control register to recognize completion of the process for CQ1 and know that the process was for LPAR#1, and issues the intercepted I/O interrupt to OS1. The channel driver 112 of OS1 recognizes the I/O interrupt, reads the contents of CQ1 and executes a completion process for the I/O process.

The channel driver 113 of OS2 106 executes the I/O process by using QP200 to QP299 and CQ2. The outline of other I/O processes is similar to that executed by OS1 105.

Data transmission has been described in this embodiment. For data reception, a designated QP# is contained in a received frame, and an I/O process is executed by using Receive Queue of the designated QP.

The embodiment of the present invention has been described above. A channel adaptor having a PCI bus interface can be shared by a plurality of OS's by acquiring the number of a virtual computer running a channel driver and generating only a table for translating a virtual address to a physical address, without using a hardware controller and local memory, without copying transfer data and without changing input/output control data.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data processing system comprising a processing unit on which a control program runs, a plurality of operating systems (OS's)configured to run under control of said control program, a Peripheral Component Interchange (PCI) bus coupled to the processing unit, and a channel adaptor for data transmission/reception, wherein:

the channel adaptor is coupled to the PCI bus on a PCI bus side of the channel adapter, and the channel adapter includes only one connecting port on an input/output (I/O) side of the channel adapter;

an input/output process is executed between each OS and said channel adaptor by using input/output process control data specifying input/output (I/O) data each having an identifier;

configuration information is provided, defining the identifier of said input/output process control data which is usable by each respective OS;

said channel adaptor configured to process a plurality of input/output process control data; and each OS uses said input/output process control data corresponding to a usable identifier and defined in said configuration information, and thereby a plurality of OS's control input/output process control data having different identifiers relative to said channel adaptor to execute the input/output process.

* * * * *